United States Patent [19]

Jensen

[11] 4,447,508

[45] May 8, 1984

[54] REDUCED MAINTENANCE EXPLOSION DAMAGE RESISTANT STORAGE BATTERY

[75] Inventor: Henry E. Jensen, Lafayette Hill, Pa.

[73] Assignee: Allied Corporation, Morris Township, Morris County, N.J.

[21] Appl. No.: 488,526

[22] Filed: Apr. 28, 1983

Related U.S. Application Data

[63] Continuation of Ser. No. 309,639, Oct. 13, 1981.

[51] Int. Cl.³ .......................................... H01M 10/34
[52] U.S. Cl. ....................................... 429/57; 429/86; 429/225
[58] Field of Search .................... 429/86, 57, 58, 225, 429/228

[56] References Cited

U.S. PATENT DOCUMENTS

| | | | |
|---|---|---|---|
| 2,465,202 | 3/1949 | Craig | 429/57 |
| 2,687,449 | 8/1954 | Gulick et al. | 429/86 |
| 2,951,106 | 8/1960 | Ruetschi | 429/225 X |
| 3,038,954 | 6/1962 | Pattison et al. | 429/86 |
| 3,630,778 | 12/1971 | Kreidl | 429/86 X |
| 3,832,238 | 8/1974 | Marui et al. | 429/86 |
| 4,002,496 | 1/1977 | Nitta et al. | 429/86 |
| 4,048,387 | 9/1977 | Lohme | 429/86 X |
| 4,098,964 | 7/1978 | Reber | 429/86 |
| 4,169,918 | 10/1979 | Moore | 429/86 X |
| 4,289,835 | 9/1981 | Lee | 429/228 X |

Primary Examiner—Charles F. Lefevour
Attorney, Agent, or Firm—James P. DeClercq

[57] ABSTRACT

A reduced maintenance, explosion damage resistant storage battery (10), having internal means for both recombining evolved gases and for protecting the battery against damage due to evolved gas ignition whether from external or internal sources is disclosed. In a first embodiment of the invention, a honeycomb-like member (60) of electrolyte-resistant material substantially fills the space within the battery above the battery electrodes, dividing this volume into a plurality of small volumes (76), surrounded by cooling surfaces, so that ignition of one small volume (76) by an external spark or by failure of an internal battery component will not cause damage. A small space (20) is left above the honeycomb member (60), and a planar catalytic recombination element (78) is provided, substantially filling this space. In a second embodiment, the honeycomb member (60) itself is the catalytic recombination element, being formed of a hydrophobic material such as polytetrafluoroethylene impregnated with platinum or palladium, or of an inert material plated with platinum or palladium.

4 Claims, 6 Drawing Figures

REDUCED MAINTENANCE EXPLOSION DAMAGE RESISTANT STORAGE BATTERY

This application is a continuation of application Ser. No. 309,639, filed Oct. 13, 1981.

BACKGROUND OF THE INVENTION

This application is related to co-pending application Ser. No. 318,301, filed Nov. 5, 1981, entitled REDUCED MAINTENANCE EXPLOSION DAMAGE RESISTANT STORAGE BATTERY.

This application relates to the field of storage batteries. In particular, this application relates to structure integral with a storage battery rendering it explosion damage resistant, and providing gas recombination means to reduce or eliminate the need for maintenance in the form of water addition.

Conventional lead-acid storage batteries, such as used for heavy duty charge-discharge applications, including such uses as powering industrial trucks, industrial street vehicles and mine locomotives, require frequent replacement of water. Water is lost from such batteries due to the electrolysis of the water in the electrolyte into hydrogen and oxygen, as well as through evaporation. This electrolysis occurs to a slight extent during operation of the battery, but primarily during overcharge, when at least some cells of the battery have accepted substantially full charge, and additional energy supplied is expended in electrolysis.

This problem is particularly severe when batteries are built for extended life, by the addition of antimony to the lead grids to increase the tensile strength and retard the degradation of the positive active material. This addition also causes undesirable side effects, which increase the internal losses of the battery, resulting in a decrease in overall battery efficiency, and an increased need for water additions. This problem has largely been overcome by substituting calcium as the hardening agent for the grids, resulting in a reduced amount of required overcharge.

The gases evolved from a battery, primarily oxygen and hydrogen, combine explosively when ignited. If ignited external to the battery, the flame enters the volume of gas confined within the battery, causing an explosion of the battery. There have been numerous attempts to solve this problem by keeping the advancing flame front from entering the battery by the use of porous membranes, which cool the gases below their ignition temperature. However, in industrial applications, it may occur that a severe overload may cause a portion of the internal structure of the battery to melt explosively, in turn igniting the gas within the battery, and causing the battery to explode. Since the source of ignition is internal to the battery, devices which cool a flame front advancing towards the battery are of no effect.

Batteries may also be provided with catalytic recombination devices containing platinum or palladium, to recombine the oxygen and hydrogen generated by the disassociation of water during the overcharge. Such devices are well-known and readily available in the form of replacement vent caps, which fit onto the top of the battery. Unfortunately, such units require considerable extra space over the top of the battery and, in most cases, this additional height is not available. In batteries for electric industrial trucks, the height of the cell is at a maximum, in order to provide the maximum number of kilowatt hours of energy for a given size truck. The same considerations apply in railroad applications, and, to a lesser extent, to automotive applications. However, in automotive applications, the addition of calcium instead of antimony as the hardening agent for grids reduces the quantity of explosive gases generated and results in a battery which does not require maintenance, since the life is five years or less, and sufficient additional electrolyte is initially provided to allow for losses due to disassociation of the water. Obviously, this approach is not useful for batteries intended for industrial use or long life.

The instant invention overcomes these and other disadvantages and problems of the prior art.

SUMMARY OF THE INVENTION

The invention provides a battery which is explosion damage resistant whether the source of ignition is exterior or interior to the battery, and which reduces or eliminates the need for maintenance in the form of adding water to the battery by providing means for catalytic recombination of the evolved gases by structure within the battery itself. In accordance with the invention, the battery is rendered explosion resistant by a honeycomb structure which is fitted over the top of the plates, to separate the evolved gases into small pockets, which will withstand the force of the resultant smaller explosions without breakage in surrounding pockets. To reduce the need for addition of water by catalytic recombination of evolved gases, a battery according to the invention is provided with a catalyst such as palladium or platinum, either as a gas recombining element in the form of a flat plate containing a catalyst in a non-wetting material resting on the honeycomb structure, or, the honeycomb structure may be made from a suitable non-wetting sintered material including small amounts of platinum or palladium, so that a single structure provides both damage-preventing and catalytic recombination features.

Therefore, it is a primary object of the invention to provide a reduced maintenance, explosion damage resistant storage battery. It is an advantage of the invention that such a storage battery does not require additional height for the provision of features which render it an explosion damage resistant and reduced maintenance battery. It is a further advantage of the invention that such a battery is explosion damage resistant whether the ignition of evolved gases is external to the battery, or internal to the battery. It is a feature of the invention that a honeycomb structure is disposed within the battery, resting either on top of the plates, or slightly above the plates, substantially filling the space above the battery electrolyte, and that the means for catalytic combination of evolved gases is located entirely within the battery.

DESCRIPTION OF THE PREFERRED EMBODIMENTS

Figure 1:
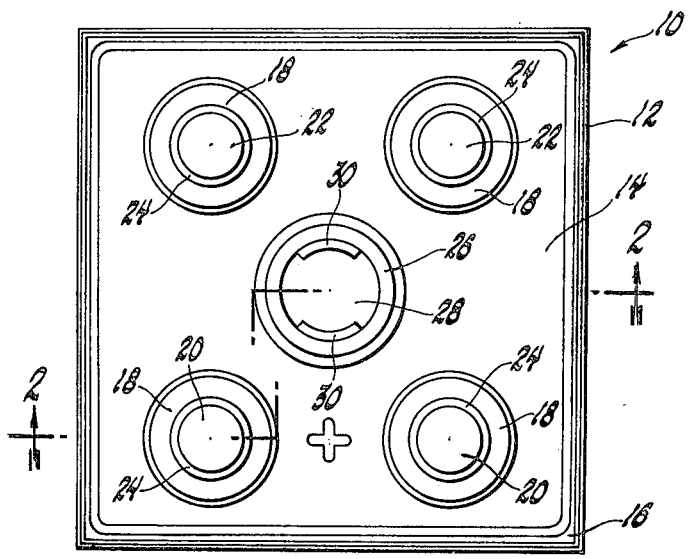
FIG. 1 is a top view of a storage battery according to the invention.

Referring to FIG. 1, a top elevational view of a battery incorporating the invention, shows a battery 10, having a case 12. In the illustrated embodiment case 12 is made of polypropylene or polyethylene. The upper end of case 12 is covered by cover member 14. It should be noted that directional references are used for description only, and not intended as limits on the scope of the invention. As illustrated, cover member 14 is joined to case 12 by sealing material 16. Cover member 14 has raised areas 18 surrounding positive posts 20 and negative posts 22. Positive posts 20 and negative posts 22 are fused to conductive inserts 24, molded in the insulating material of cover member 14, thus forming a seal around posts 20 and 22. Preferably, inserts 24 and posts 20 and 22 are made of pure lead or lead alloy. Cover member 14 also includes, as illustrated, a central raised area 26 surrounding a filling opening 28 which is provided with interrupted threads 30 for retaining a conventional battery cap or vent plug, not shown.

Figure 2:
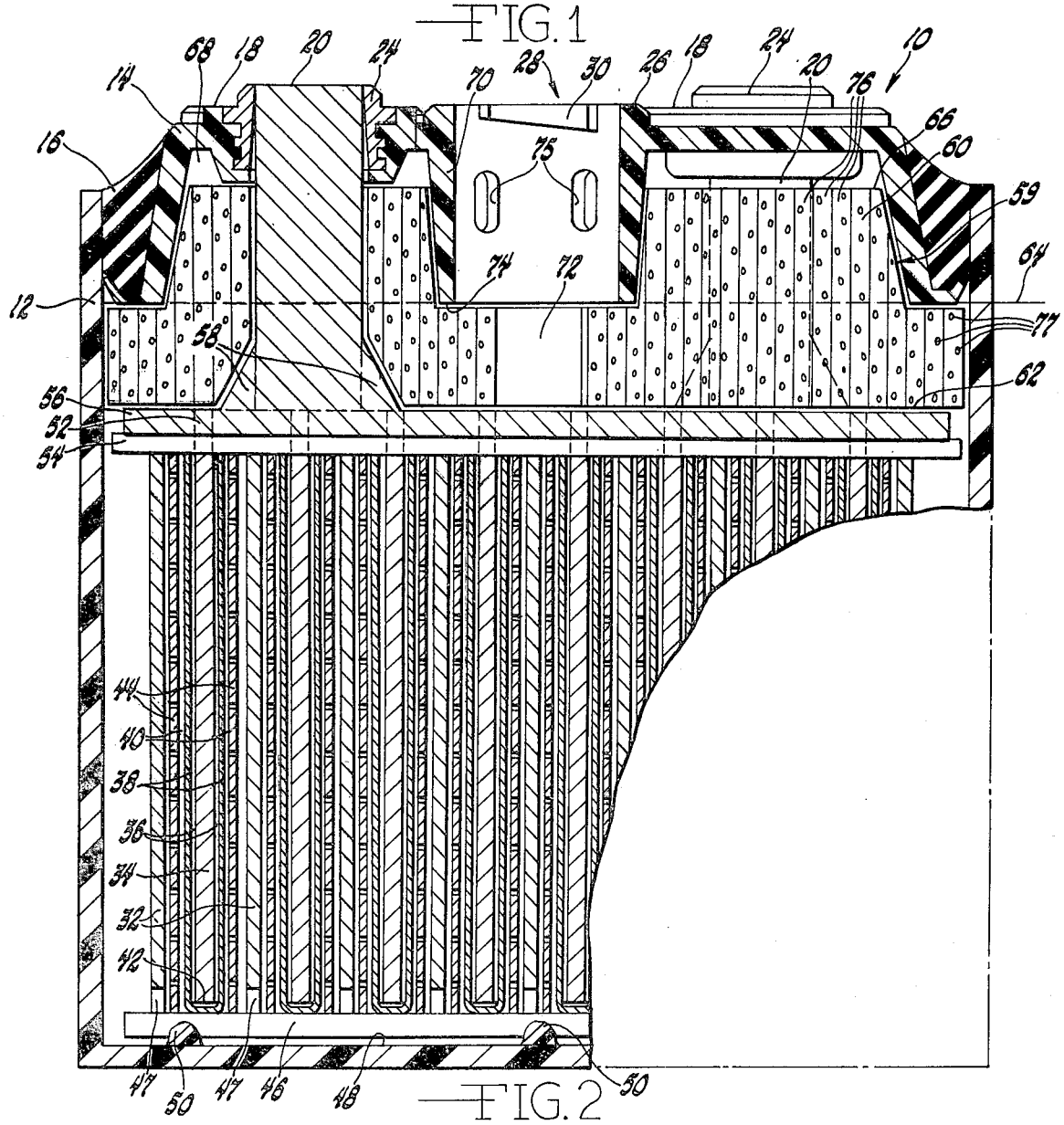
FIG. 2 is a side elevational sectional view taken along line 2—2 in FIG. 1, showing an integral means for resisting explosion damage and recombining evolved gases.

FIG. 2 shows a side elevational sectional view of a battery 10 according to the invention, where the means for resisting explosion damage due to ignition of gases evolved from the active elements of battery 10, particularly during the overcharge portion of a charging cycle, and the means for catalytically recombining the evolved gases, oxygen and hydrogen, is a single member. As shown, battery 10 includes a plurality of negative plates 32 and positive plates 34. To prevent loss of active material from the positive plates 34 as the battery is used, a prefabricated mat 36 of finely-divided strands of a suitable material such as glass are used. Mats 36 are held firmly against the surfaces of a positive plate 34, by mats shown as mats 38 and 40. Mat 36 is bonded to mat 38, which is wrapped around the faces and bottom of a plate 34, and mat 40 is wrapped around the faces and sides of a plate 34, over mats 36 and 38. Thin retaining and separating assemblies 44 hold mats 36, 38 and 40 firmly in place. Assemblies 44 include retainers which are perforated adjacent the central portion of the surfaces of plates 34, and imperforate along their bottom and side edges to prevent mossing, the growth of free lead particles at the edges of negative plates, such as plates 32, from forming a conductive bridge between plates 32 and 34. Assemblies 44 also include microporous separators extending beyond the edges of negative plates 32, negative plates 32 being smaller than positive plates 34, further separating and insulating a plate 32 from a plate 34. Negative plates 32 are supported upon bridge member 46 by tabs 47 so that separators 44 extend beyond the edges of negative plates 32, further reducing the possibility of electrical shorts forming between positive plates 34 and negative plates 32. Bridge member 46 is supported above the floor 48 of case 12 by support members 50, so that whatever sediment does form will not build unduly high in any area of floor 48. In the view shown, tabs 52 of positive plates 34 pass through perforated moss shield 54 and are joined to positive strap 56, made of pure lead or a lead alloy. Moss shield 54 reduces the opportunity for interplate shorts forming at the tops of the plates. Positive strap 56 is joined to positive posts 20, and the connection between positive strap 56 and positive post 20 is reinforced by support members 58.

Explosion damage to battery 10, due to either internal or external ignition of evolved gases, is prevented by means of flash or explosion suppression means here shown as a honeycomb structure 60, disposed within battery 10. As illustrated, honeycomb member 60 rests upon positive strap 56, and on a corresponding negative strap, not shown in FIG. 2, thus having a lower edge 62 below electrolyte level 64 and an upper edge 66 which is above electrolyte level 64 in battery 10. As illustrated, member 60 fills the majority of the volume of a first chamber 59 between moss shield 54 and cover member 14. As shown, a small space or second chamber 68 may be left above honeycomb member 60, to allow the escape of any gases which may be evolved and not previously recombined. As shown, member 60 is formed to fit closely around battery posts, such as positive post 20 and negative post 22, support members 58, and wall 70, which defines filling opening 28. As shown, member 60 has a reduced-diameter opening 72 adjacent filling opening 28, between moss shield 54 and lower edge 74 of wall 70, adequate to receive a hydrometer or thermometer, while reducing the amount of gas which may be contained in filling opening 28 to the smallest possible amount. Evolved gas which may escape, escapes through vent openings 75 in wall 70. As can be seen, member 60 thus divides the majority of the space within battery 10 above electrolyte level 64 into a plurality of individual pockets or chambers 76, each so small that ignition of gas within one such pocket will not result in any damage to battery 10, and isolates the gas in one pocket from gases in other such pockets, to minimize and localize the explosive results of ignition of evolved gases. Although there is some communication between pockets 76 through space 68, it will be apparent that, due to the presence of member 60, and its thermal mass, the majority of the evolved gases within battery 10 may be held below combustion temperature even if a small volume of evolved gases is raised above combustion temperature by some means of ignition, either within or without battery 10.

Honeycomb member 60 must be made of a material which is inert to the electrolyte used, and may be made of any appropriate material. For instance, it may be made of lead, to further improve its heat-absorption capability and explosion reduction capability, or, as illustrated, may include a material which catalyzes the recombination of evolved gases such as hydrogen and oxygen. Platinum and palladium are well-known materials for this purpose. If member 60 is made of lead, it must be electrically insulated from positive and negative straps such as strap 56 by a layer of a suitable plastic material, not shown.

As illustrated, member 60 is made of a powdered material, preferably a hydrophobic material which resists flooding, and small pellets 77 of a catalyst material such as platinum or palladium mixed and molded in the form of member 60. Among the materials useful to support the pellets of catalyst material is polytetrafluoroethylene resin, such as is sold under the registered trademark Teflon. Other suitable molding materials which are resistant to the electrolyte used will be apparent, and may also be used.

Member 60 may also be formed of an inert material, and subsequently plated with platinum or palladium. A member 60 plated with a catalyst, such as by flashplating, will serve to recombine much of the evolved gas, reducing the loss of water from the electrolyte, and reducing the need for maintenance, while simultaneously reducing the magnitude of any explosion that may result from ignition of evolved gases to a magnitude which will not cause bursting of the battery and throwing about of acid electrolyte.

Figure 3:
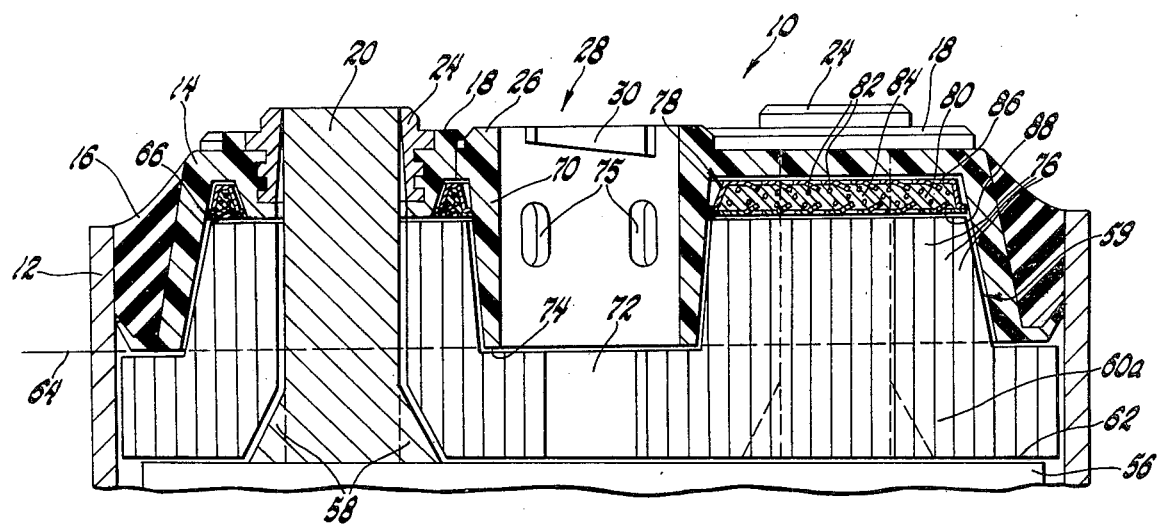
FIG. 3 is a side elevational sectional view, taken along line 2—2 in FIG. 1 showing a second embodiment of a battery provided with separate means for resisting explosion damage and recombining evolved gases.

FIG. 3 is a partial view of a battery 10, showing a second preferred embodiment of means for resisting explosion and reducing water loss due to evolved gases. As in the embodiment shown in FIG. 2, a flash or explosion suppressing means here shown as honeycomb member 60a is disposed within battery 10, extending both above and below electrolyte level 64. In the embodiment illustrated, honeycomb member 60a does not perform a catalytic recombination function, but merely protects battery 10 against the results of ignition of evolved gases. A means for recombining the evolved gases is shown disposed in a space or chamber identified with the reference number 68 in FIG. 2, between the top edge 66 of the honeycomb member 60a and cover member 14. As shown in FIG. 3, a catalyst member 78 is substantially planar, and includes a catalytic mixture 80 including catalyst pellets 82 in a hydrophobic powder 84. Preferably, pellets 82 are of platinum or palladium, and hydrophobic or non-wetting powder 84 is silica carbon or graphite powder treated with a hydrophobic material such as silicon or powdered Teflon. Thus, pellets 82 are supported, and protected against an uncontrolled rate of contact with evolved gases. Mixture 82 is constrained between a first plate member 86 and a second plate member 88. Both first and second plate member 86 and 88 are perforated, to allow the entrance of evolved gases, the perforations being small enough to prevent the escape of catalytic mixture 80. Preferably, plate members 86 and 88 are made of lead, to assist in dissipation of the heat of recombination of the evolved gases, but can also be made of any suitable plastic.

Figure 4:
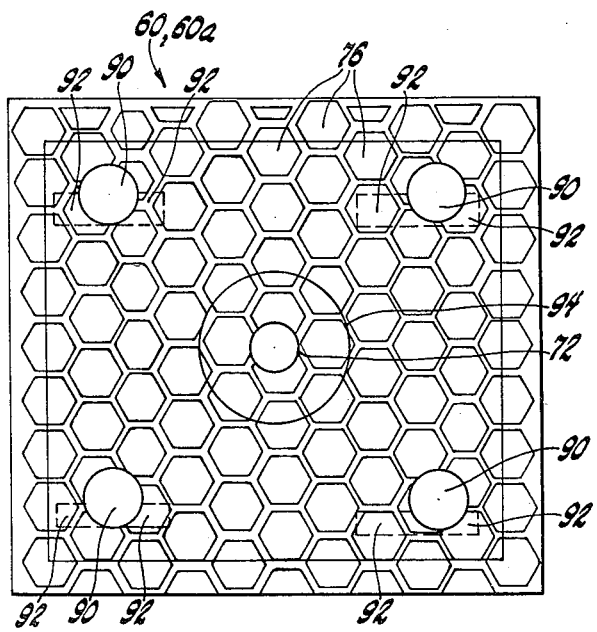
FIG. 4 is a top elevational view of the means for resisting explosion damage as shown in FIGS. 2 and 3.

Referring now to FIG. 4, a top plan view of a preferred embodiment of a member such as 60 or 60a is shown. As shown, member 60, 60a defines a plurality of honeycomb-shaped chambers or pockets 76, thus dividing the gases within battery 10 into small individual pockets. Honeycomb member 60, 60a is provided with opening 90 to clear positive and negative battery posts 20 and 22, and with recesses 92 to clear support members 58, if used, and with a recess 94 to clear wall 70 of filling opening 28, as well as a reduced-diameter filling opening 72, here shown centrally disposed as appropriate for the battery shown in FIGS. 1-3.

Figure 5:
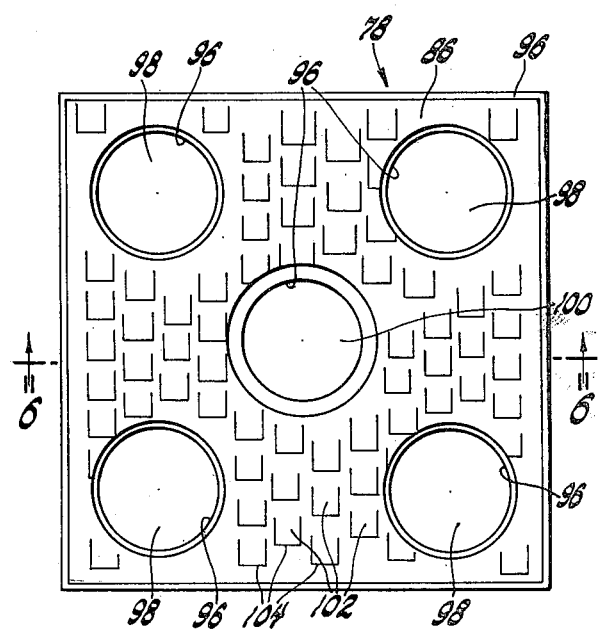
FIG. 5 is a top elevational view of the means for recombining evolved gases shown in FIG. 3.
Figure 6:
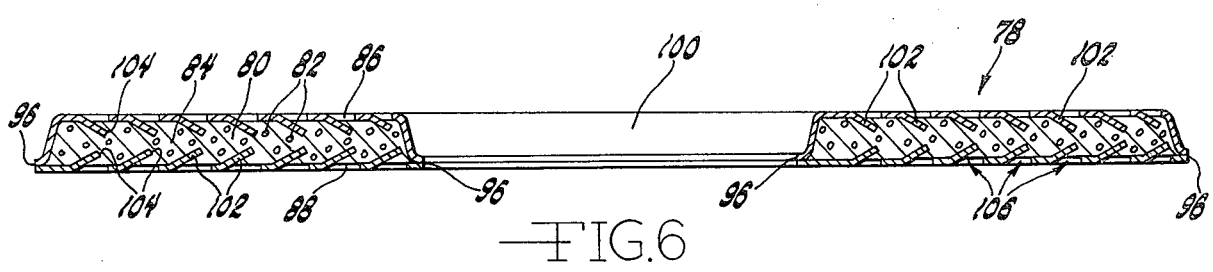
FIG. 6 is a side elevational view, taken along line 6—6 in FIG. 5.

Referring now to FIGS. 5 and 6, a catalyst member 78, as shown in FIG. 3, is depicted. First plate member 86 and second plate member 88 are joined together at edges 96, catalyst member 78 defining a plurality of openings 98, to provide for the passage of battery posts such as post 20, 24 therethrough, and a filling opening 100, here shown as a centrally-disposed filling opening. In the embodiment illustrated, first and second plate members 86, 88 are perforated by shearing a portion of the periphery of a plurality of areas 102. As shown in FIG. 6, edges 104 of areas 102 are deflected inwardly, defining openings 106 which are too small to allow the escape of catalytic mixture 80.

As will be apparent, numerous variations and modifications of the catalytic recombination means and explosion resistant means disclosed herein will be obvious to one skilled in the relevant art, and may be easily made without further invention and without departing from the spirit and scope of this invention.

I claim:

1. An explosion damage resistant reduced maintenance storage battery, comprising:
   a case containing a plurality of negative plates and positive plates and a quantity of electrolytes
   said case defining a first chamber between said negative and positive plates in an uppermost surface of said case;
   a first strap member electrically connected to said plurality of positive plates, and a second strap member electrically connected to said plurality of negative plates;
   a first post member electrically connected to said first strap member and passing through said chamber and said uppermost surface, and a second post member electrically connected to said second strap member and passing through said chamber and said uppermost surface;
   a honeycomb member disposed in said first chamber and around said first post member and around said second post member and defining a second chamber substantially smaller than said first chamber between said honeycomb member and said uppermost surface;
   said honeycomb member dividing said first chamber into a plurality of separated linearly extending gas chambers having lower ends below the surface of said electrolyte and having upper ends communicating with said second chamber;
   said case defining a vent opening through said uppermost surface communicating with said second chamber.

2. An explosion damage resistant reduced maintenance storage battery according to claim 1, wherein:
   a substantially planar catalytic recombination element is disposed in said second chamber and around said first post member and around said second post member and supported upon said honeycomb member;
   said element including a first surface member and a second surface member;
   said first surface member and said second surface member defining a catalyst space therebetween, said first surface member and said second surface member each defining a plurality of perforations therethrough;
   a catalyst matrix being disposed in said catalyst space; and
   said catalyst matrix includes powdered material which resists flooding and a multitude of pellets of a catalyst.

3. An explosion damage resistant reduced maintenance storage battery according to claim 2, wherein:
   said powdered material which resists flooding consists of silica treated with a material chosen from the group consisting of silicone and polytetrafluoroethylene; and
   said catalyst is selected from the group consisting of platinum and palladium.

4. An explosion damage resistant reduced maintenance storage battery according to claim 2, wherein:
   said first surface member and said second surface member are perforated lead sheets, said sheets defining openings for receiving said first post member therethrough and receiving said second post member therethrough, and further defining a filling opening therethrough.

* * * * *